US012728964B2

(12) United States Patent
Vouillamoz et al.

(10) Patent No.: US 12,728,964 B2
(45) Date of Patent: Sep. 8, 2026

(54) MODULAR FLOATING TERRITORY

(71) Applicant: LEGACY FOUNDRY AG, Zürich (CH)

(72) Inventors: Lucien Vouillamoz, Feusisberg (CH); Alain Jaccard, Ste-Croix (CH)

(73) Assignee: SEANEST S.A., St-Blaise (CH)

( * ) Notice: Subject to any disclaimer, the term of this patent is extended or adjusted under 35 U.S.C. 154(b) by 757 days.

(21) Appl. No.: 17/622,720

(22) PCT Filed: Jun. 29, 2020

(86) PCT No.: PCT/IB2020/056129
§ 371 (c)(1),
(2) Date: Dec. 24, 2021

(87) PCT Pub. No.: WO2020/261240
PCT Pub. Date: Dec. 30, 2020

(65) Prior Publication Data
US 2022/0250721 A1 Aug. 11, 2022

Related U.S. Application Data

(60) Provisional application No. 63/011,318, filed on Apr. 17, 2020, provisional application No. 62/981,547, (Continued)

(51) Int. Cl.
*B63B 35/44* (2006.01)
*F03B 13/20* (2006.01)

(52) U.S. Cl.
CPC .............. *B63B 35/44* (2013.01); *F03B 13/20* (2013.01); *B63B 2035/4426* (2013.01); (Continued)

(58) Field of Classification Search
CPC ............ B63B 35/44; B63B 2035/4426; B63B 2035/4466; B63B 2035/4493; (Continued)

(56) References Cited

U.S. PATENT DOCUMENTS 250,104 A * 11/1881 Roberts ............... F03B 13/1815 60/507
4,622,473 A 11/1986 Curry
(Continued)

FOREIGN PATENT DOCUMENTS

CN 106385228 A 2/2017
DE 102013201716 A1 8/2014
(Continued)

OTHER PUBLICATIONS

International Search Report for International Application No. PCT/IB2020/056129.

*Primary Examiner* — Anthony D Wiest
(74) *Attorney, Agent, or Firm* — Da Vinci Partners LLC; John Moetteli

(57) ABSTRACT

A floating territory made of a semi-rigid floating structure. The structure is able to follow the upward and downward movement of the waves. It can be installed as well close to the shores as in high sea, carrying a rigid structure. Said rigid structure acts like a bridge between the waves and provides a substantially stable surface for the installation of structures for human activity. Said rigid structure remains above the water level. The floating territory can be stabilized in position dynamically by propellers compensating the movement of the streams and/or winds, or by submersed weights attached to said rigid structure, or by pillars planted in the ground attached to said rigid structure. This leaves a vertical freedom of movement to follow the movement of the waves or the tides.

27 Claims, 10 Drawing Sheets

Related U.S. Application Data filed on Feb. 26, 2020, provisional application No. 62/867,311, filed on Jun. 27, 2019.

(52) U.S. Cl.
CPC ................. *B63B 2035/4466* (2013.01); *B63B 2035/4493* (2013.01); *B63B 2207/00* (2013.01); *B63B 2209/14* (2013.01); *F05B 2220/707* (2013.01)

(58) Field of Classification Search
CPC . B63B 2207/00; B63B 2209/14; F03B 13/20; F03B 13/1845; F03B 11/00; F03B 11/02; F03B 13/1815; F03B 13/26; F05B 2220/707; Y02E 10/20; Y02E 10/30
See application file for complete search history.

(56) References Cited

U.S. PATENT DOCUMENTS

| | | | |
|---|---|---|---|
| 9,764,804 | B1 | 9/2017 | Kennamer, Sr. |
| 2016/0186715 | A1 | 6/2016 | Fait |

FOREIGN PATENT DOCUMENTS

| | | | |
|---|---|---|---|
| DE | 102015217550 | A1 | 3/2017 |
| JP | S5728875 | A | 2/1982 |
| JP | S61222892 | A | 10/1986 |
| JP | 2005059675 | A | 3/2005 |
| JP | 2007521436 | A | 8/2007 |
| JP | 2017137051 | A | 8/2017 |
| WO | 2010061199 | A2 | 6/2010 |
| WO | 2016193922 | A1 | 12/2016 |

* cited by examiner

MODULAR FLOATING TERRITORY

CROSS REFERENCE TO RELATED APPLICATIONS

This application claims the benefit of U.S. Provisional Application No. 62/867,311, filed Jun. 27, 2019, U.S. Provisional Application No. 62/981,547, filed Feb. 26, 2020 and U.S. Provisional Application 63/011,318, filed Apr. 17, 2020 the content of the entirety of which is explicitly incorporated herein by reference and relied upon to define features for which protection may be sought hereby as it is believed that the entirety thereof contributes to solving the technical problem underlying the invention, some features that may be mentioned hereunder being of particular importance.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

This invention relates to modular floating structures that may be installed on large lakes, rivers, seas, and oceans.

The global warming induces a raise in sea level which leads to the disappearance of habitable ground.

What is needed is an effective means of replacing or creating additional territory suitable for human habitation or activities.

SUMMARY OF THE INVENTION

This invention combines a flexible floating structure able to follow the upward and downward movement of the waves and that can therefore be installed as well close to the shores as in high sea, with a rigid superstructure built on said flexible structure, providing a substantially stable surface for the building of human habitation and other human activities.

BRIEF DESCRIPTION OF THE DRAWINGS

The attached drawings represent, by way of example, different embodiments of the subject of the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

Figure 1A:
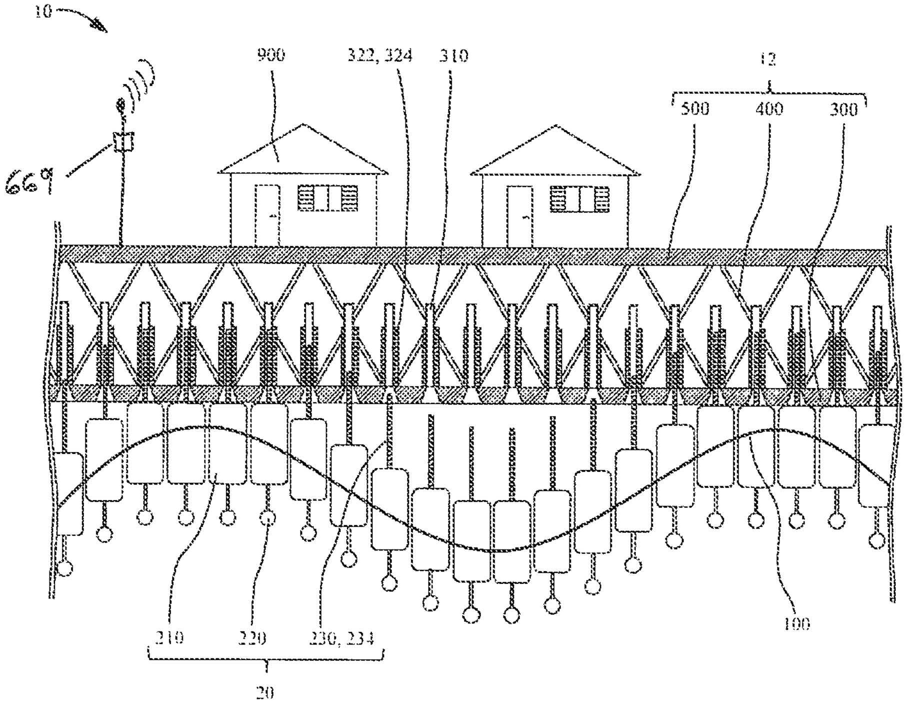
FIG. 1A-1C are semi-immersed side views of a floating territory of the invention.
Figure 1B:
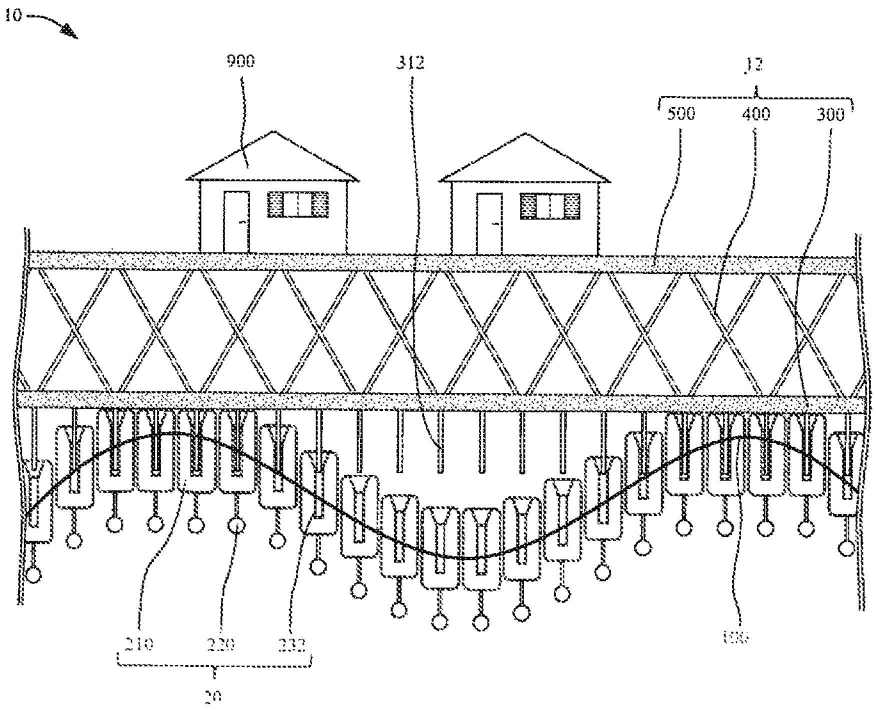
Figure 1C:
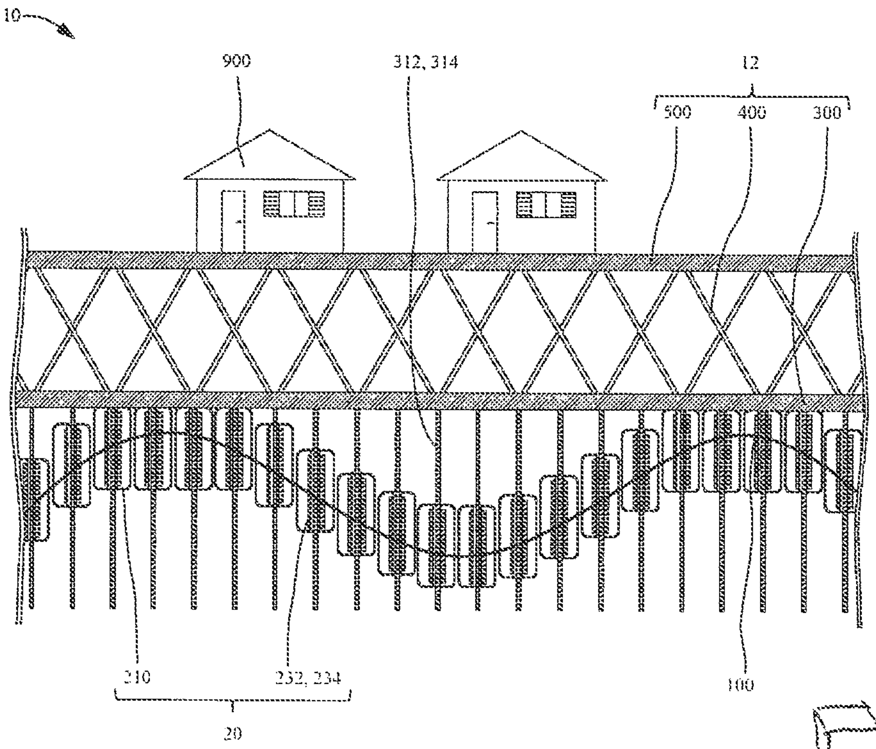

Referring now to FIG. 1A, FIG. 1B and FIG. 1C, the floating territory 10 according to this invention comprises a flexible structure 20 floating on water 100, carrying a rigid superstructure 12. The rigid superstructure 12 is made of a bottom flat surface 300 and a top flat surface 500, held together by a lightweight structure 400. Typically the bottom surface 300, the lightweight structure 400 and the top surface 500 may be made of an assembly of bamboo poles, of metallic structure, or made of any other appropriate materials, recycled materials, materials recuperated out of the water, or any combination thereof. The top surface 500 is made so as to provide a substantially continuous floor for the installation 900 for human or other activities. The bottom surface 300 is not necessarily a continuous surface, but provides sufficient support to transmit the lifting force from the flexible structure 20 to the superstructure 12.

The flexible structure 20 is made as an assembly of floatable building components or buoys 210 made from recycled plastic waste or any other suitable material, such buoys 210 having the shape of a prism with any shape such as a regular polygon base, a circle, a triangle, a square, a pentagon, a hexagon, etc. or any appropriate shape. The flexible structure 20 and/or the buoys 210 may be made as described in PCT/IB2019/056405, the contents of the entirety of which are explicitly incorporated herein by reference and relied upon to define features for which protection may be sought hereby. Optionally the vertical orientation of the buoys 210 is ensured by ballast weights 220, such ballast weights may be installed below the buoy 210 or inside of it. The ballast weights 220 may be made with an appropriate shape so as to be used as rudders to ensure the maneuverability of the territory/island 10, and may be orientable for such purpose. Optionally the buoys 210 are made with sliding dovetail shapes and grooves for sliding attachment to each other's neighbouring element, said attachments allowing said buoys 210 to slide vertically relative to each other, allowing the flexible structure 20 to follow the upward and downward movement of the waves. Optionally, the buoys 210 are attached to each other by means of ropes, cables, chains, or any other appropriate flexible means that keep them together to form the flexible structure 20 while allowing the buoys 210 to move vertically relative to each other, thus allowing the flexible structure 20 to follow the upward and downward movement of the waves.

The flexible structure 20 may carry a larger surface than the superstructure 12, for providing adjacent surfaces that don't need a rigid superstructure 12, for example for agriculture, to provide an access to the water surface 100, or for any other use. In such case the edge of the bottom surface 300 must follow the shape of the buoys 210 to ensure each buoy is either fully covered by the bottom surface 300, or completely free to move vertically, avoiding interference with the optional dovetail shapes and grooves.

Figure 1D:
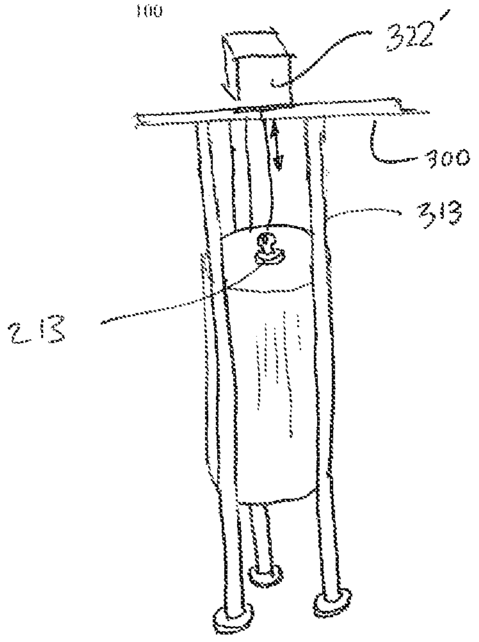
FIG. 1D is a perspective view of an alternate arrangement of constraining a buoy to move only along a vertical axis.

To ensure the horizontal relative positioning between the rigid superstructure 12 and the flexible structure 20, some or all buoys 210 are equipped with a mast 230 that can engage in a guiding hole 310 provided in the bottom surface 300, preventing relative creeping between the superstructure 12 and the flexible structure 20. Alternatively the buoys 210 are equipped with a guiding hole 232 and the bottom surface 300 is equipped with masts 312. The guiding holes 232 may be blind holes, or may run completely through the buoys 210 (FIG. 1C). In another case, the buoys 210 have an attachment system that keeps them together horizontally, such as for example sliding dovetail shapes and grooves, or added vertical slides, or other attachment providing vertical freedom of movement, then only a few of the buoys 210 needs to be linked to the superstructure 12. In another case, the buoys 210 are not attached together they need to be all equipped with the masts 230 or guiding holes 232, and the length of the masts 230 needs to be sufficient so that they never disengaged from the guiding holes 232. Referring to FIG. 1D, in another case, each buoy 210 may be formed as a simple cylinder without a central hole and be retained to move along a vertical axis by at least three masts 313 that capture the buoy 210. The buoy 210 may then be connected with a cable to a pull generator 322' to generate electricity from the regular up and down movements of the buoy. Where the connection 213 to the buoy allows rotation of the buoy, the later embodiment has the advantage that wear of the buoy is distributed across its entire surface, resulting in a high useful life of the buoy. Still further, the combination of masts and guiding holes 230, 232, 310, 312 may be connected to energy harvesting system 322, 322' so as to convert the energy provided by the movement of the waves into usable energy for powering the installations 900 of the island 10, for example by converting it into electricity or rotational motion from which. The energy harvesting system 322 may be a series of pull generators 322' such as Potenco's Pull-Cord Power Generator (www.youtube.com/watch?v=Fb0iz_WXvYg) attached to buoys 210, or use linear generators 322, or dynamos, for example. Linear electricity generators 322 may be installed in and around the masts and guiding holes 230, 232, 310, 312. For example in the configuration of FIG. 1C a series of magnets 234 may be installed in the buoys 210 around the guiding hole 232, and induction coils 314 installed in the mast 312 aligned on a vertical axis, in such case the relative movement of the induction coils and magnets while the buoy moves up and down follows the movement of the waves and generates a voltage on the induction coils. This voltage may be used to power electrical installations 900. Preferably, the induction coils 314 may be installed in the part which is fixed relative to the superstructure so as to avoid movement of electricity cables and make water tightness of the electricity generation system easier. In the example of the configuration of FIG. 1A, the induction coils 324 may therefore preferably be installed around the guiding hole 310, and the magnets 234 within the masts 230. Other systems as known in the industry, for example dynamos, dynamos based on rack and pinion mechanisms, hydraulic systems such as wave surge converters, overtopping devices, oscillating water column systems, etc., may be used to convert the relative linear movement between the buoys 210 and the superstructure 12 into usable energy, for example electricity. Wave energy converters such as those provided by Aqua Magnetics, Inc (described in U.S. Pat. No. 6,791,205 of Sep. 14, 2004, the contents of which are hereby incorporated by reference herein) and SINN Power GmbH (Germeringer Str. 9, 82131 Gauting, Germany, website: www.sinnpower.com/waveenergy, described in U.S. Pat. No. 9,973,057, German patent publication DE102008048730A1, the contents of which are hereby incorporated by reference herein) may be advantageously used to build the flexible structure 20 and convert the energy provided by the movement of the waves into usable energy for powering the installations 900 of the island 10. To avoid dragging down the superstructure 12 when the buoys 210 follow the downwards movement of the waves, none or a significantly lower amount of energy may be harvested during the downward movement of the buoys 210, compared to the energy that is harvested during the upward movement of the buoys 210, which tends to lift up the superstructure 12. Potentially energy may be harvested only during the phase when the buoys move upwards. A part of the energy provided by the relative movements of the masts and guiding holes 230, 232, 310, 312 may be converted mechanically directly into rotation of propellers installed below the floating structure 20 so as to mobilize the floating territory 10, for example to compensate for marine streams. It may also be connected to amortization features to minimize the noise of the installation.

The surface of the territory 10 is large enough to cover the maximum possible distance between two waves, so that the rigid superstructure 12 behaves like a bridge in all directions from wave crest to wave crest and the top surface 500 of the island 10 remains substantially horizontal. In general the waves are distant from about 8-10 times their height, so rigid superstructure 12 needs to be dimensioned according to the waters it will be used on. Typical length and width of the floating territory 10 are at least 50 meters, generally more than 100 meters.

The dimensioning of the flexible floating structure 20 and the ballast weights 220 is made with sufficient margin so that the flexible floating structure 20 carries the rigid superstructure 12 always above the surface of the water 100. As a consequence, only a part of the buoys 210, for example 50%, preferably 30% of the buoys 210 are dimensioned to be sufficient to ensure the floating of the whole island 10, in this way the superstructure 12 remains above the surface of the water 100 even in case of large waves. This is what makes it possible to build the rigid superstructure 12 in a lightweight construction instead of having to build it as a boat hull, because it only needs to function as a bridge between wave crests.

The floating territory 10 may be mobilized by motors placed in or below the buoys 210 or directly attached to the superstructure 12 so as to follow the seasons around the year to promote agriculture or comfortable living, or to follow the sun around the day, or for any other reason. Alternatively, motors placed in or below the buoys 210 or directly attached to the superstructure 12 may be used to mobilize the floating territory 10 so as to compensate for the marine streams and/or winds and ensure a permanent geolocalization of the floating territory 10, for example using GPS or similar localization systems as reference. For example the floating territory may as well be used to constitute a mobile bridge between parts of land.

Figure 2:
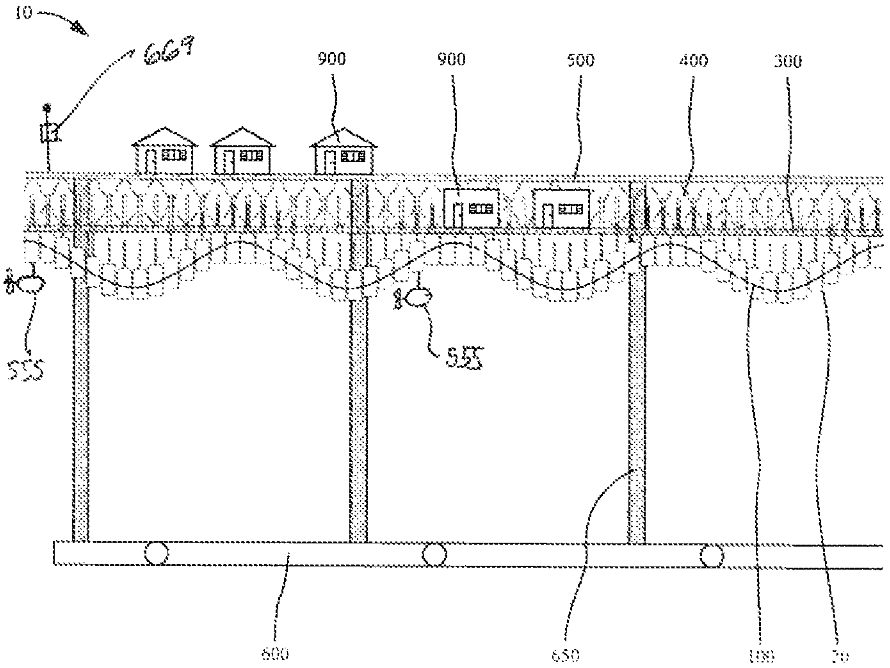
FIG. 2 is a semi-immersed side view of an alternative embodiment of a floating territory of the invention.

Referring now to FIG. 2, underwater neutrally buoyant weights 600, placed at a sufficient depth so as not to be subject to the marine streams, may be attached to the rigid superstructure 12 via supports 650 and to the ocean floor with anchors 601 in order to stabilize the position of the island 10. Installations 900 for human or other activities may be located on the top surface 500 of the island 10, or on the bottom surface 300 when easy access to the water is desirable.

Figure 3:
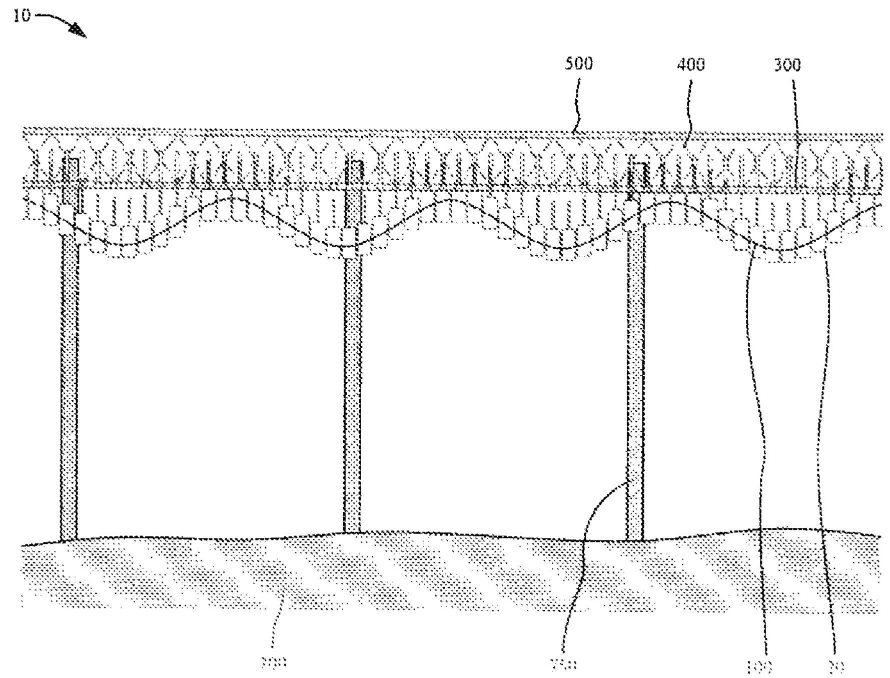
FIG. 3 is a semi-immersed side view of a further alternative embodiment of a floating territory of the invention.

Referring now to FIG. 3, pillars 750 may be planted in the ground 700, the mooring of the rigid superstructure 12 to the pillars 750 keeping a freedom to move vertically for the island 10 to be able to follow the waves and tides. The pillars 750 provide the horizontal attachment of the rigid superstructure 12 the flexible structure 20 determine the altitude of the island. The vertical movement of the island 10 relative to the ground 700 may be used to harvest energy for powering the installations 900 of the island 10, for example by converting it into electricity.

Figure 4A:
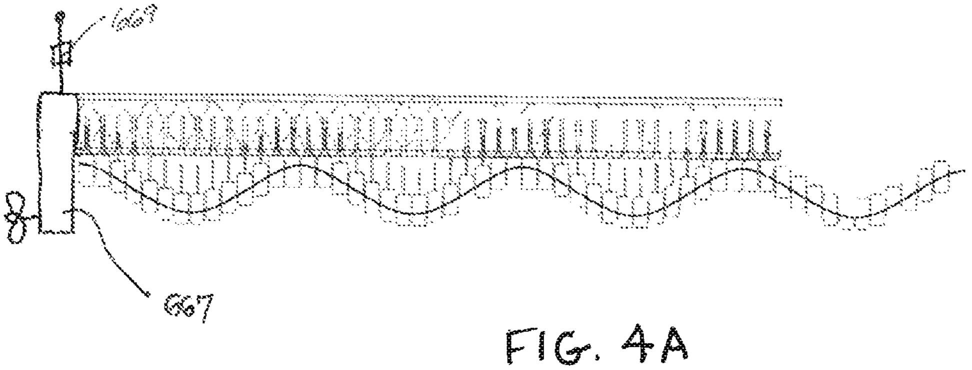
FIG. 4A is a semi-immersed side view of an alternative embodiment of a floating territory of the invention showing that the flexible structure can extend beyond the superstructure.
Figure 4B:
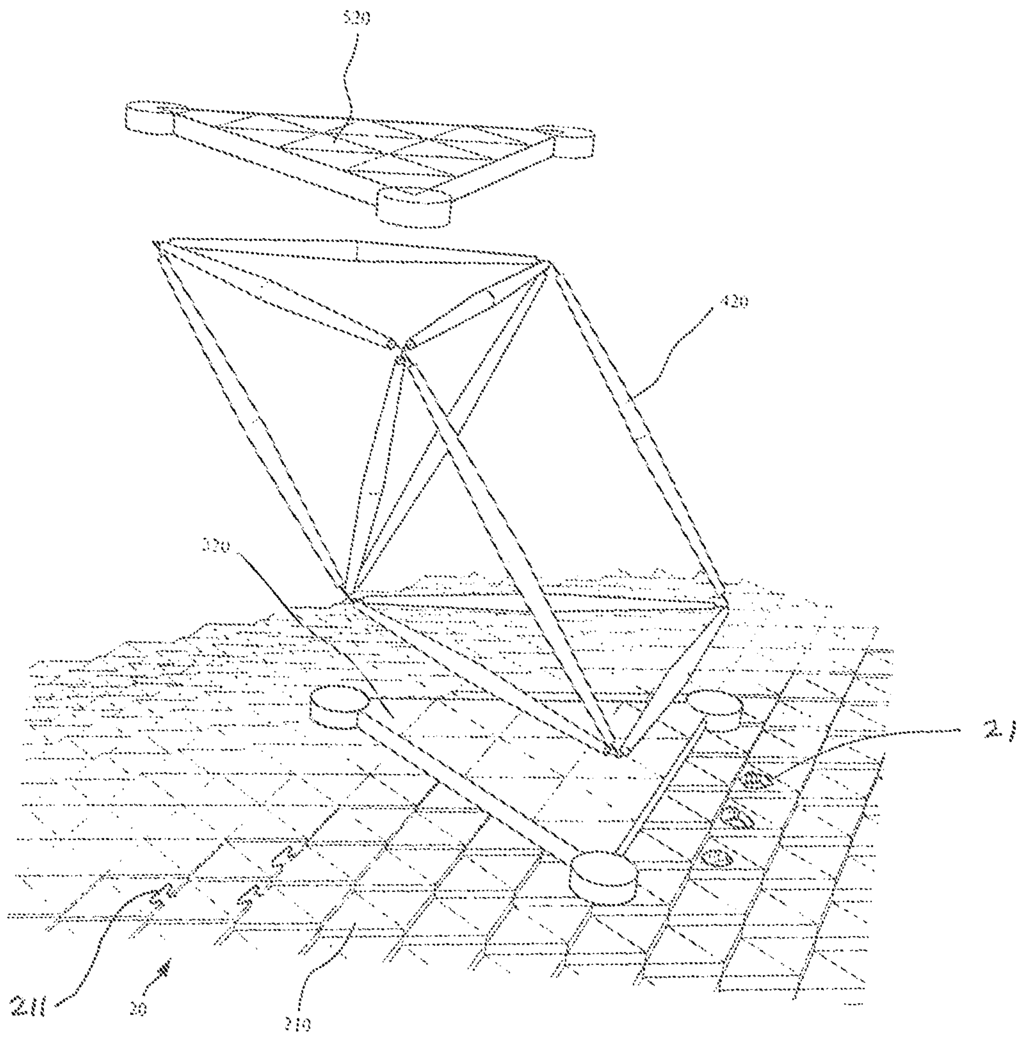
FIG. 4B is an exploded perspective view of the superstructure of a floating territory of the invention.
Figure 5:
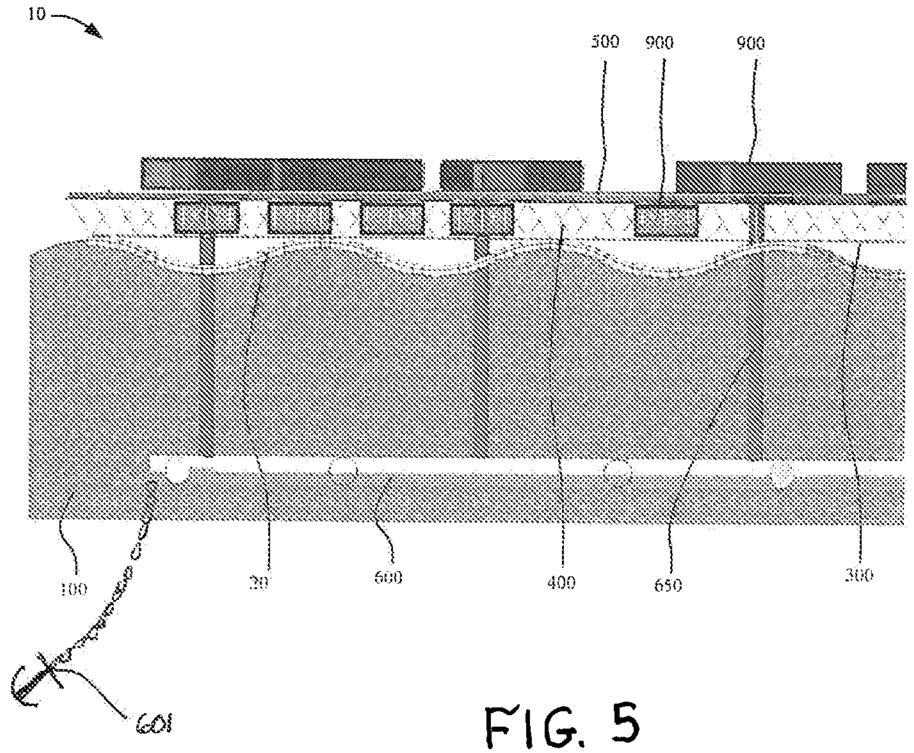
FIG. 5 is a side view of a floating territory of the invention.
Figure 6:
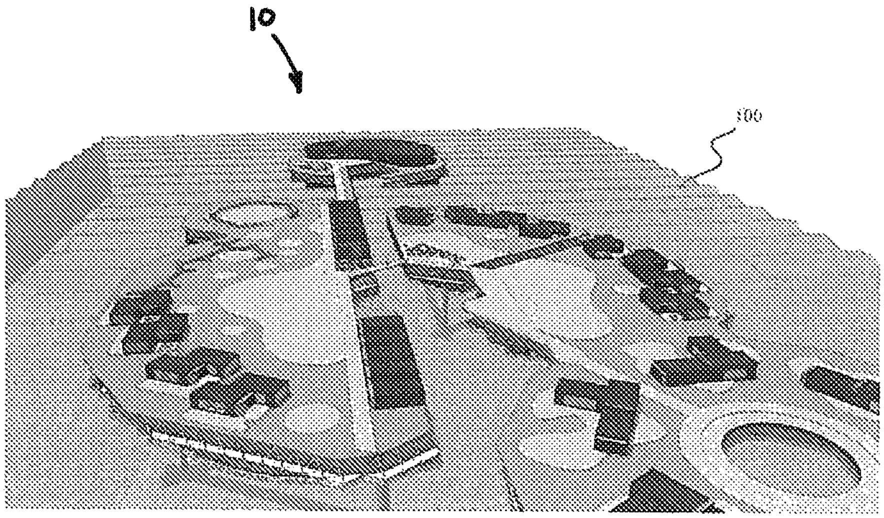
FIG. 6 is a perspective view of the floating territory of the invention.
Figure 7:
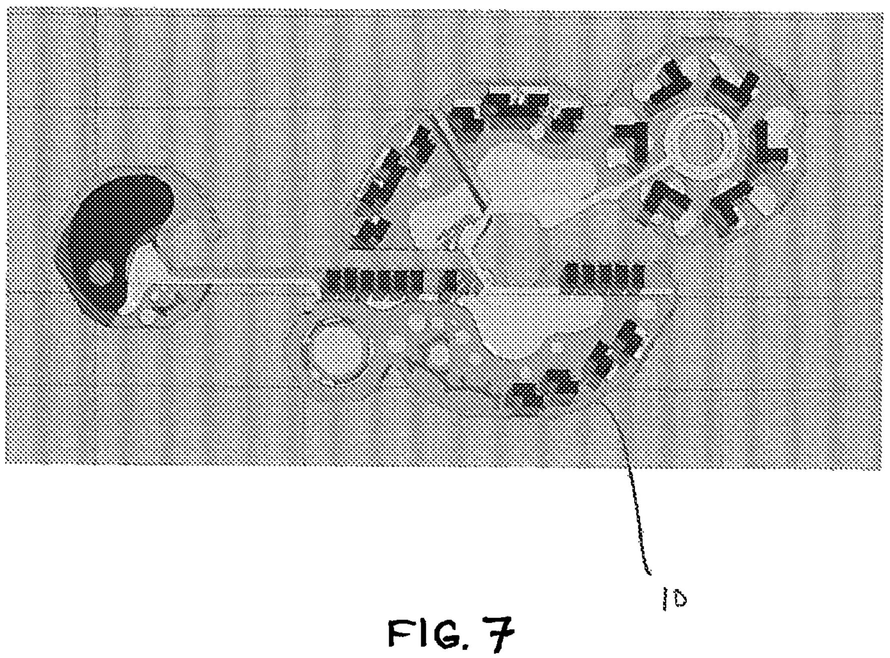
FIG. 7 is a top view of the floating territory of the invention.

Referring now to FIGS. 4A and 4B, the rigid superstructure 12 can be disassembled in sections to allow the maintenance of the floating structure 20. The construction of the bottom flat surface 300 is made in modular sections 320 matching groups of buoys 210, so that when the modular section 320 is removed, free access to the buoys 210 is provided. The buoys 210 may then be removed for cleaning or repair, exchanged against new buoys 210, treated for antifouling, the ballast weights 220 may be exchanged for heavier or lighter payload, etc. The elements 420 constituting the lightweight structure 400 and the plates 520 constituting the top flat surface 500 are designed so as to allow local disassembly to allow for the maintenance operations. The modular construction described here can also be used to progressively change the shape and size of the territory 10, to combine several floating territories together, to create or close access to water, to adapt to heavier or lighter payload, etc. The flexible structure 20 can include divots 21 on their top surfaces into which earth can be disposed and plants planted, allowing for harvesting of edible fruits and vegetables.

The invention can be summarized as follows:

1. A floating territory (10) comprising a flexible structure (20) and a superstructure (12), the flexible structure (20) being configured to float on water (100), the superstructure (12) being optionally a rigid superstructure (12), the superstructure (12) supported directly or indirectly in the horizontal plane by buoys (210) of the flexible structure (20) guided to move along a substantially vertical axis by at least one vertical column (230, 312, 314), the buoys adapted to float in water, optionally floating on the respective crest of waves on the water, the superstructure (12) comprising a bottom substantially flat surface (300), a top substantially flat surface (500) affixed together by a lightweight structure (400), the lightweight structure (400) being between the bottom substantially flat surface (300) and the top substantially flat surface (500), the bottom substantially flat surface (300) providing sufficient support to transmit lifting forces from the flexible structure (20) to the superstructure (12).
2. The floating territory (10) of feature set 1, in combination with an electric generation system (322) to power dynamos or induction coils which use the motion of the buoys to generate electricity from wave motion.
3. The floating territory (10) of the above feature set, wherein the electric generation system (322) comprises one of the group of components consisting of power dynamos, induction coils, and pull generators.
4. The floating territory (10) of any one of the above feature sets, wherein the superstructure (12) comprises one or more installations (900) for human or other activities, the installations (900) being located on top of the flat surface (500) and/or below the flat surface (500).
5. The floating territory of any one of the above feature sets, wherein the superstructure (12) comprises one or more agriculture surfaces such as earthen fields on which edible plants are cultivated.
6. The floating territory (10) of the above feature set, wherein the agriculture surfaces are configured to provide access to the surface of the water (100).
7. The floating territory (10) of any one of the above feature sets, wherein the buoys (210) optionally being shaped as a prism and being made of a material selected from one of a list of materials consisting of bamboo poles, metal, recycled material, material recuperated out of the water, and any combination of the aforementioned materials.
8. The floating territory (10) of feature set 7, wherein the buoys (210) are prism-shaped and their base has a shape being a regular polygon, a circle, a triangle, a square, a pentagon, or a hexagon.
9. The floating territory (10) of feature set 7, wherein at least one buoy (210) has a dove-tail interface (211), the adjacent buoy comprising grooves for sliding attachment of the dove tails to neighboring buoys (210), the so attached buoys (210) are configured to slide vertically relative to each other allowing the flexible structure (20) to follow the upward and downward movement of waves of the water (100).
10. The floating territory of any one of feature sets 7 or 9, further having a plurality of the buoys (210) comprising at least one mast (230), the bottom surface (300) of the superstructure (12) comprising at least one guiding hole (310), the at least one mast (230) adapted to slidingly engage in the guiding hole (310) and being configured to ensure controlled vertical movement and to prevent horizontal displacement of the flexible structure (20) with respect to the rigid superstructure (10).
11. The floating territory of any one of feature sets 7 or 9, wherein at least one buoy (210) comprises a guiding hole (232), the bottom surface (300) of the superstructure (12) comprises at least one mast (312) slideably engaging the guiding hole (232) and being configured to ensure controlled vertical movement and to prevent horizontal displacement of the flexible structure (20) with respect to the rigid superstructure (12).
12. The floating territory (10) of feature sets 10 or 11, wherein an energy generation system (322) is connected to the buoy (210) so as to generate energy from the up and down motion of the buoy.

13. The floating territory (10) of feature sets 12, wherein the energy powers one or more installations (900) of the floating territory (10), the energy being electrical and/or mechanical energy.
14. The floating territory (10) of any one of feature sets 1 or 13, wherein the bottom surface (300) is made of a material selected from one of the group of materials consisting of bamboo poles, metal, recycled material, material recuperated out of the water, and any combination of the aforementioned materials.
15. The floating territory (10) of any one of feature sets 1 or 13, wherein the top surface (500) is made of a material selected from one of the group of materials consisting of bamboo poles, metal, recycled material, material recuperated out of the water, and any combination of the aforementioned materials.
16. The floating territory (10) of any one of feature sets 1 or 13, wherein the lightweight structure (400) is made of a material selected from one of the group of materials consisting of bamboo poles, metal, recycled material, material recuperated out of the water, and any combination of the aforementioned materials.
17. The floating territory (10) of any of the preceding feature sets, wherein the top surface (500) has a substantially continuous floor suitable for the installation of facilities and/or infrastructure for humans or other activities.
18. The floating territory (10) of any one of the preceding feature sets, wherein one or more ballast weights (220) are structurally affixed to at least one of the one or more buoy (210), the ballast weights (220) being configured to ensure a substantially vertical orientation of the buoy (210), the one or more ballast weights (220) being structurally affixed to the at least one of the one or more buoys (210) below and/or inside said buoy (210).
19. The floating territory (10) of feature set 18, wherein one or more of the one or more ballast weights (220) being shaped so as to function as rudders to maneuver the floating territory.
20. The floating territory (10) of any one of feature sets 1 or 19, wherein the floating territory is mobilized by motors (555) placed in or below the buoys (210).
21. The floating territory of any one of feature sets 1 or 19, wherein the floating territory (10) is mobilized by motors (667) directly attached to the superstructure (20).
22. The floating territory (10) of feature set 20 or 21, wherein the motors (555, 667) are used to propel the floating territory (10) so as to compensate for the marine streams and/or winds and ensure a substantially permanent geolocalization of the floating territory (10), using GPS or similar localization systems as reference.
23. The floating territory (10) of the above feature set, wherein a GPS system (669) provides inputs to a propulsion system (555, 667) which controls the location of the floating territory.
24. The floating territory (10) of any one of the preceding feature sets, wherein the floating territory comprises weights (600) and supports (650), the weights (600) being attached to the superstructure (12) via the supports (650), the weights (600) being placed at sufficient depth so as not to be subject to currents or marine streams in order to stabilize the position of the floating territory (10).
25. The floating territory (10) of any one of the preceding feature sets, wherein the floating territory (10) comprises pillars (750), the pillars (750) being attached to the superstructure (12) so as to provide limited horizontal freedom of movement and substantial vertical freedom of movement, the vertical freedom of movement enabling the superstructure (12) to follow waves and tides, wherein the pillars (750) are anchored in the ground (700) or essentially neutrally buoyant so that anchoring to the ground is not necessary.
26. The floating territory (10) of feature set 25, wherein an energy generation system (322) is connected to the pillars (750) and the superstructure (12) so as to harvest energy from the relative movement between at least one pillar (750) and the superstructure (12).
27. The floating territory (10) of feature sets 26, wherein the energy is powering one or more installations (900) of the floating territory (10), the energy being electrical and/or mechanical energy.
28. The floating territory (10) of any one of the preceding feature sets, wherein the superstructure (12) is made of modular sections (320) that connect to at least one other modular section (320), the modular sections (320) being configured to be disassembleable from one or all of its neighboring modular sections (320) to allow maintenance of the floating structure (20).
29. The floating territory (10) of feature sets 28, wherein one modular section (320) or a group of modular sections (320) are positioned so as to be aligned with one buoy (210) or a group of buoys (210), thereby allowing free access to the buoy (210) when the modular section (320) is disassembled and removed.

Figure 8:
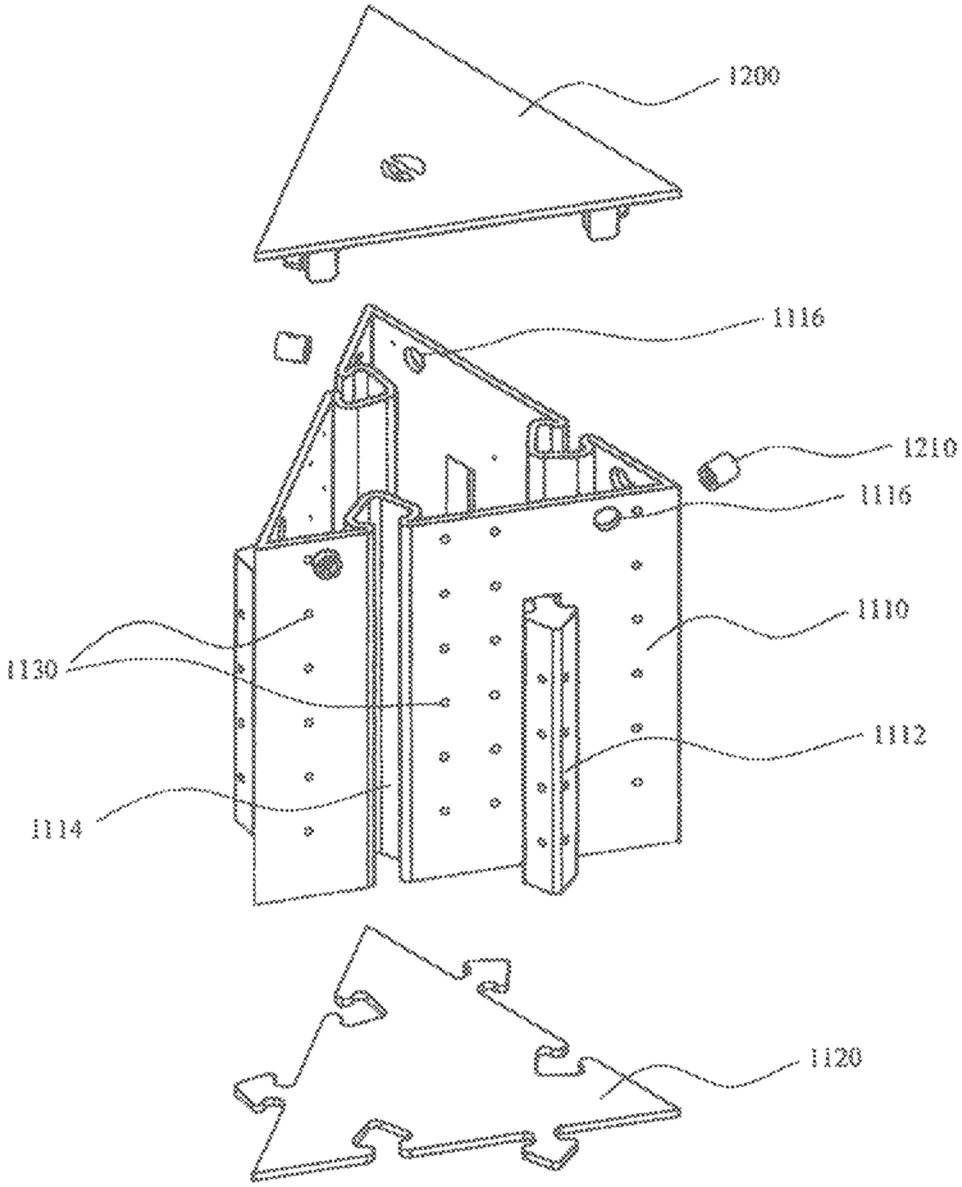
FIG. 8 is an exploded view of a floater of the modular floating territory of the invention.

Referring now to FIG. 8, the system according to the present invention may be advantageously built using a combination of hollow construction elements 1100, covers 1200 and lockers 1210. The construction element 1100 may essentially have the shape of a prism with a 20 regular polygon base, such as a triangle, a square, a pentagon, a hexagon, etc. combined with dovetails 1112 and dovetail grooves 1114 for attachment to neighboring construction elements. The bottom 1120 of the construction element 1100 may optionally be produced as a separate part and assembled unto the wall 1110 to form a watertight hollow container. The bottom 1120 of the construction element 100 may optionally contain a valve or a tightly closable lid so as to allow emptying or filling of the construction element. Attachment of the bottom 1120 to the wall 1110 may use gluing, welding, over molding, or any other water-tight attachment technique known in the industry. In one embodiment, locking elements such as set screws may also be used. The bottom 1120 and the wall 1110 of the construction element 1100 may also be produced directly in one piece, using processes like injection molding, blow molding, thermoforming, extrusion, and any other process known in the art. At least one dovetail 1112 and dovetail groove 1114 is present on each side of the wall 1110, so as to provide an attachment means to a neighboring construction element while keeping a freedom to move and providing a guiding vertically. The wall 1110 may include holes 1116 near the top surface of the construction element 1100 so as to be located above the water level and allow a substantially rigid attachment when inserting the lockers 1210 in the holes 1116. The dovetails 1112 may have a length shorter than the height of the construction element 1100, so that the addition of a cover 1200 on top of the construction element 1100 closing the end of the dovetail groove 1114 limits the freedom to move vertically, relative to a neighboring construction element

1100. The cover 1200 may have several functions, such as closing the construction element 1100 in a watertight manner, and/or limiting the vertical freedom of movement of a given construction elements relative to its neighbors, and/or providing a substantially seamless surface together with the neighbouring construction elements. It has to be understood that the "dovetail and dovetail groove" wording used here describes by way of example any other combination of shapes that allows interlocking two construction elements while maintaining a freedom to move or slide and providing a guiding in one essentially linear direction. The walls 1110 of the construction element 1100 may have bumps 1130 on its surface to avoid any sticking effect when immersed in the water, so that the vertical guiding effect happens with minimal friction. Surface treatment against friction, and/or antifouling surface treatment may also be applied on the surface of the construction element 1100. In fact, ocean or lake water can act as a lubricant to minimize wear between the elements as they rub against each other during relative movement. The bottom 1120 of the construction element 1100 may also present additional features protruding under the water, such as fins or spoilers, to impart a preferred direction of movement for the floating territory in the surrounding water, particularly water that is flowing, or to manage the lateral forces produced by the marine currents. Motors driving propellers and control surfaces such as rudders may be attached under one or more of the construction elements 1100 of a floating territory to allow for displacement of the entire territory.

In an advantage, the invention provides new floating territories suitable for animal and/or human habitation and activities.

In another advantage, the invention provides new floating territories including an energy source based on the movement of the waves and/or tides, which is not dependent on the weather nor on the duration of the day and night cycle.

In a further advantage, the invention provides new floating territories including a sufficient energy source to make it energetically independent from the shore for the production of electricity, clean water, and any other amenities for the permanent animal and/or human habitation and activities.

In still a further advantage, the invention provides new floating territories which are modular and can be permanently adapted to the evolution of the needs in terms of shape, surface, payload, energy production, etc.

In still a further advantage, the invention provides new floating territories which can be mobilized so as to follow the seasons around the year to promote agriculture or comfortable living, or to follow the sun around the day, or for any other reason, or on the contrary, to compensate for the marine streams and/or winds and ensure its permanent geolocalization.

In yet another advantage, the more mass the superstructure has (which is the case when houses or other structures are build on it), the less the superstructure moves when the buoys move, thereby providing greater buoy movement from which energy can be extracted.

It should be appreciated that the particular implementations shown and herein described are representative of the invention and its best mode and are not intended to limit the scope of the present invention in any way.

As will be appreciated by skilled artisans, the present invention may be embodied as a system, a device, or a method.

The present invention is described herein with reference to block diagrams, devices, components, and modules, according to various aspects of the invention. It will be understood that each functional block of the blocks diagrams, and combinations of functional blocks in the block diagrams, can be implemented by computer program instructions which may be loaded onto a general purpose computer, special purpose computer, or other programmable data processing apparatus to produce a machine, such that the instructions which execute on the computer or other programmable data processing apparatus create enable the functionality specified in the block diagrams.

Accordingly, the block diagram illustrations support combinations of means for performing the specified functions, combinations of steps for performing the specified functions, and program instruction means for performing the specified functions. Each functional block of the block diagrams and flowchart illustrations, and combinations of functional blocks in the block diagrams, may be implemented by either special purpose hardware-based computer systems which perform the specified functions or steps, or suitable combinations thereof.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-&-vis the public or third parties, no express or implied license is granted to prepare derivative works based on this patent specification, inclusive of the appendix hereto and any computer program comprised therein.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A floating territory comprising a flexible structure and a superstructure the flexible structure being configured to float on water, the flexible structure comprising a plurality of elements, the elements comprising at least one buoy, at least one mast and at least one ballast weight, the at least one buoy, the at least one mast and the at least one ballast weight being arranged such that the at least one ballast weight in interaction with the at least one buoy brings the at least one mast in a substantially vertical orientation thereby defining a substantially vertical axis, the elements configured to allow sufficient vertical freedom to follow the movement of waves when placed on the surface of water, the superstructure being a rigid superstructure, the superstructure supported directly or indirectly in the horizontal plane by the buoys of the flexible structure, the buoys being guided to move along the substantially vertical axis by the at least one mast, the buoys adapted to float in water, on the respective crest of waves on the water, such that the buoys are typically not submerged in the water, the superstructure comprising a bottom substantially flat surface, a top substantially flat surface and a lightweight structure between the bottom substantially flat surface and the top substantially flat surface, the top substantially flat surface being suitable for installation of infrastructure permitting human activities, the bottom substantially flat surface being configured for resting on the flexible structure, the top substantially flat surface and the bottom substantially flat surface being affixed together by the lightweight structure so as to make the superstructure rigid to form a bridge from one wave crest to another wave crest, the bottom substantially flat surface providing support to transmit lifting forces from the flexible structure to the superstructure, the superstructure comprising guiding holes, the guiding holes being configured to slidingly accommodate at least one mast such that the at least one mast is guided though the bottom substantially flat surface in order to access the guiding hole, at least one buoy has a dove-tail interface, the adjacent buoy comprising grooves for sliding attachment of the dove tails to neighboring buoys, the so attached buoys are configured to slide vertically relative to each other allowing the flexible structure to follow the upward and downward movement of waves of the water.

2. The floating territory of claim 1, in combination with an electric generation system to power dynamos or induction coils which use the motion of the buoys to generate electricity from wave motion.

3. The floating territory of claim 2, wherein the electric generation system comprises one of the group of components consisting of power dynamos, induction coils, and pull generators.

4. The floating territory of claim 1, wherein the superstructure comprises one or more installations for human or other activities, the installations being located on top of the flat surface and/or below the flat surface.

5. The floating territory of claim 1, wherein the superstructure comprises one or more agriculture surfaces on which edible plants are cultivated.

6. The floating territory of claim 5, wherein the agriculture surfaces are configured to provide access to the surface of the water.

7. The floating territory of claim 1, wherein the buoys are made of a material selected from one of a list of materials consisting of bamboo poles, metal, recycled material, material recuperated out of the water, and any combination of the aforementioned materials.

8. The floating territory of claim 7, wherein the buoys are prism-shaped and their base has a shape being a regular polygon, a circle, a triangle, a square, a pentagon, or a hexagon.

9. The floating territory of claim 8, further having a plurality of the buoys comprising at least one mast, the bottom substantially flat surface of the superstructure comprising at least one guiding hole, the at least one mast adapted to slidingly engage in the guiding hole and being configured to ensure controlled vertical movement and to prevent horizontal displacement of the flexible structure with respect to the rigid superstructure.

10. The floating territory of claim 9, wherein an energy generation system is connected to the buoy so as to generate energy from the up and down motion of the buoy.

11. The floating territory of claim 1, wherein the bottom substantially flat surface is made of a material selected from one of the group of materials consisting of bamboo poles, metal, recycled material, material recuperated out of the water, and any combination of the aforementioned materials.

12. The floating territory of claim 1, wherein the top substantially flat surface is made of a material selected from one of the group of materials consisting of bamboo poles, metal, recycled material, material recuperated out of the water, and any combination of the aforementioned materials.

13. The floating territory of claim 1, wherein the lightweight structure is made of a material selected from one of the group of materials consisting of bamboo poles, metal, recycled material, material recuperated out of the water, and any combination of the aforementioned materials.

14. The floating territory of claim 1, wherein the top substantially flat surface has a substantially continuous floor suitable for the installation of facilities and/or infrastructure for humans or other activities.

15. The floating territory of claim 1, wherein one or more ballast weights are structurally affixed to at least one of the one or more buoy, the ballast weights being configured to ensure a substantially vertical orientation of the buoy, the one or more ballast weights being structurally affixed to the at least one of the one or more buoys below and/or inside said buoy.

16. The floating territory of claim 15, wherein the floating territory is mobilized by motors directly attached to the superstructure.

17. The floating territory of claim 16, wherein the motors are used to propel the floating territory so as to compensate for the marine streams and/or winds and ensure a substantially permanent geolocalization of the floating territory, using GPS or similar localization systems as reference.

18. The floating territory of claim 1, wherein a GPS system provides inputs to a propulsion system which controls the location of the floating territory.

19. The floating territory of claim 1, wherein the floating territory comprises weights and supports, the weights being attached to the superstructure via the supports, the weights being placed at sufficient depth so as not to be subject to currents or marine streams in order to stabilize the position of the floating territory.

20. The floating territory of claim 1, wherein the floating territory comprises pillars, the pillars being attached to the superstructure so as to provide limited horizontal freedom of movement and substantial vertical freedom of movement, the vertical freedom of movement enabling the superstructure to follow waves and tides, wherein the pillars are anchored in the ground or essentially neutrally buoyant so that anchoring to the ground is not necessary.

21. The floating territory of claim 1, wherein an energy generation system is connected to the pillars and the superstructure so as to harvest energy from the relative movement between at least one pillar and the superstructure.

22. The floating territory of claim 21, wherein the energy is powering one or more installations of the floating territory, the energy being electrical and/or mechanical energy.

23. The floating territory of claim 1, wherein the superstructure is made of modular sections that connect to at least one other modular section, the modular sections being configured to be disassembleable from one or all of its neighboring modular sections to allow maintenance of the floating structure.

24. The floating territory of claim 23, wherein one modular section or a group of modular sections are positioned so as to be aligned with one buoy or a group of buoys, thereby allowing free access to the buoy when the modular section is disassembled and removed.

25. A floating territory comprising a flexible structure and a superstructure, the flexible structure being configured to float on water, the flexible structure comprising at least one buoy and at least one ballast weight, the superstructure comprising a bottom substantially flat surface, a top substantially flat surface and a lightweight structure between the bottom substantially flat surface and the top substantially flat surface, at least one buoy comprises a guiding hole, the bottom substantially flat surface of the superstructure comprises at least one mast slidably engaging the guiding hole and being configured to ensure controlled vertical movement and to prevent horizontal displacement of the flexible structure with respect to the rigid superstructure, the at least one buoy, the at least one mast and the at least one ballast weight being arranged such that the at least one ballast weight in interaction with the at least one buoy brings the at least one buoy in a substantially vertical orientation thereby defining a substantially vertical axis, the flexible structure configured to allow sufficient vertical freedom to follow the movement of waves when placed on the surface of water, the superstructure being a rigid superstructure, the superstructure supported directly or indirectly in the horizontal plane by the buoys of the flexible structure, the buoys being guided to move along the substantially vertical axis by the at least one mast, the buoys adapted to float in water, the respective crest of waves on the water, such that the buoys are typically not submerged in the water, the top substantially flat surface being suitable for installation of infrastructure permitting human activities, the bottom substantially flat surface being configured for resting on the flexible structure, the top substantially flat surface and the bottom substantially flat surface being affixed together by the lightweight structure so as to make the superstructure rigid to form a bridge from one wave crest to another wave crest, the bottom substantially flat surface providing support to transmit lifting forces from the flexible structure to the superstructure, wherein further at least one buoy has a dove-tail interface, the adjacent buoy comprising grooves for sliding attachment of the dove tails to neighboring buoys.

26. The floating territory of claim 25, wherein an energy generation system is connected to the buoy so as to generate energy from the up and down motion of the buoy.

27. The floating territory of claim 26, wherein the energy powers one or more installations of the floating territory, the energy being electrical and/or mechanical energy.

* * * * *